United States Patent
Lepeska et al.

(10) Patent No.: US 10,387,522 B2
(45) Date of Patent: Aug. 20, 2019

(54) HINT MODEL UPDATING USING AUTOMATED BROWSING CLUSTERS

(71) Applicant: VIASAT, INC., Carlsbad, CA (US)

(72) Inventors: Peter J Lepeska, Boston, MA (US); David F Lerner, Newton, MA (US); Eric E Prouty, Roxbury, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/957,523

(22) Filed: Apr. 19, 2018

(65) Prior Publication Data

US 2018/0246982 A1    Aug. 30, 2018

Related U.S. Application Data

(63) Continuation of application No. PCT/US2015/056375, filed on Oct. 20, 2015.

(51) Int. Cl.
*G06F 17/00* (2019.01)
*G06F 16/957* (2019.01)
(Continued)

(52) U.S. Cl.
CPC .......... *G06F 16/9574* (2019.01); *G06F 16/23* (2019.01); *G06F 16/954* (2019.01);
(Continued)

(58) Field of Classification Search
CPC .......... G06F 17/3002; G06F 17/30424; G06F 17/30873; G06F 2212/6028; G06F 16/9574; G06F 16/9566; H04L 67/02
(Continued)

(56) References Cited

U.S. PATENT DOCUMENTS 6,085,193 A    7/2000   Malkin et al.
6,622,168 B1 *  9/2003  Datta ...................... H04L 29/06
                                                709/219
(Continued)

FOREIGN PATENT DOCUMENTS

WO    WO-2017/069735 A1    4/2017

OTHER PUBLICATIONS

International Search Report and Written Opinion mailed in International (PCT) Application No. PCT/US2015/056375 dated Jun. 28, 2016, 9 pgs.
(Continued)

*Primary Examiner* — Mohammed H Zuberi
(74) *Attorney, Agent, or Firm* — Kilpatrick Townsend & Stockton LLP

(57) ABSTRACT

Embodiments seek to improve prefetch hinting by using automated browsing clusters to generate and update hinting models used for machine-generated hints. For example, hinting machines can include browsing clusters that autonomously fetch web pages in response to update triggers (e.g., client web page requests, scheduled web crawling, etc.) and generate timing and/or other hinting-related feedback relating to which resources were used to load the fetched web pages. The hinting machines can use the hinting feedback to generate and/or update hinting models, which can be used for machine-generation of hints. Some embodiments can provide preliminary hinting functionality in response to client hinting requests, for example, when hinting models for a requested page are insufficient (e.g., unavailable, outdated, etc.). For example, without having a sufficient hinting model in place, the hinting machine can fetch the page to generate preliminary hinting feedback, which it can use to machine-generate preliminary hints.

30 Claims, 6 Drawing Sheets

(51) Int. Cl.
  *G06F 16/23* (2019.01)
  *G06F 16/954* (2019.01)
  *G06F 16/955* (2019.01)
  *H04L 29/08* (2006.01)

(52) U.S. Cl.
  CPC .. *G06F 16/9566* (2019.01); *G06F 2212/6028* (2013.01); *H04L 67/02* (2013.01)

(58) Field of Classification Search
  USPC .......................................................... 715/234
  See application file for complete search history.

(56) References Cited

U.S. PATENT DOCUMENTS

| | | | |
|---|---|---|---|
| 7,418,494 B2* | 8/2008 | Dahlin | H04L 29/06 370/229 |
| 8,335,838 B2 | 12/2012 | Zhang et al. | |
| 8,341,245 B1 | 12/2012 | Roskind et al. | |
| 8,478,843 B1 | 7/2013 | Ortlieb et al. | |
| 9,037,638 B1* | 5/2015 | Lepeska | H04L 67/2847 709/203 |
| 9,083,583 B1 | 7/2015 | Roskind et al. | |
| 9,083,584 B2 | 7/2015 | Lee | |
| 9,106,607 B1 | 8/2015 | Lepeska et al. | |
| 9,135,364 B1 | 9/2015 | Sundaram et al. | |
| 9,239,862 B2* | 1/2016 | Mizrotsky | G06F 17/30424 |
| 9,524,287 B2* | 12/2016 | Davis | G06F 17/2247 |
| 9,613,158 B1 | 4/2017 | Lepeska | |
| 2002/0010761 A1 | 1/2002 | Carneal et al. | |
| 2006/0149826 A1* | 7/2006 | Rooney | G06F 16/1834 709/217 |
| 2006/0294223 A1* | 12/2006 | Glasgow | H04L 67/2847 709/224 |
| 2008/0114773 A1 | 5/2008 | Choi et al. | |
| 2013/0226837 A1 | 8/2013 | Lymberopoulos et al. | |
| 2013/0226992 A1* | 8/2013 | Bapst | H04L 67/42 709/203 |
| 2013/0297561 A1 | 11/2013 | Mizrotsky et al. | |
| 2015/0156194 A1 | 6/2015 | Modi et al. | |
| 2015/0304384 A1* | 10/2015 | Lee | H04L 67/02 709/203 |
| 2015/0350370 A1 | 12/2015 | Lepeska et al. | |

OTHER PUBLICATIONS

International Preliminary Report on Patentability mailed in International (PCT) Application No. PCT/US2015/056375 dated May 3, 2018, 6 pgs.
U.S. Appl. No. 14/692,156, filed Apr. 21, 2015, 121 pgs.
Election of Species Requirement mailed in U.S. Appl. No. 14/692,156 on Sep. 5, 2017, 6 pgs.
Response to Election of Species Requirement filed in U.S. Appl. No. 14/692,156 on Oct. 24, 2017, 12 pgs.
Non-Final Office Action mailed in U.S. Appl. No. 14/692,156 dated Nov. 30, 2017, 16 pgs.
Response to Non-Final Office Action filed in U.S. Appl. No. 14/692,156 dated May 25, 2018, 19 pgs.
Final Office Action mailed in U.S. Appl. No. 14/692,156 dated Jul. 27, 2018, 9 pgs.
Response to Final Office Action filed in U.S. Appl. No. 14/692,156 dated Oct. 1, 2018, 17 pgs.
Advisory Action mailed in U.S. Appl. No. 14/692,156 dated Oct. 12, 2018, 2 pgs.
Notice of Allowance mailed in U.S. Appl. No. 14/692,156 dated Jan. 29, 2019, 7 pgs.
Ex Parte Quayle Action mailed in U.S. Appl. No. 14/692,156 dated Apr. 24, 2019, 4 pgs.
Amendment and Response to Ex Parte Quayle Action filed in U.S. Appl. No. 14/692,156 dated Jun. 11, 2019, 6 pgs.
U.S. Appl. No. 15/948,177, filed Apr. 9, 2018, 123 pgs.
Non-Final Office Action mailed in U.S. Appl. No. 15/948,177 dated Jul. 27, 2018, 19 pgs.
Response to Non-Final Office Action filed in U.S. Appl. No. 15/948,177 dated Oct. 29, 2018, 15 pgs.
Final Office Action mailed in U.S. Appl. No. 15/948,177 dated Nov. 27, 2018, 12 pgs.
Amendment and Response to Final Office Action filed in U.S. Appl. No. 15/948,177 dated Feb. 20, 2019, 13 pgs.
Non-Final Office Action mailed in U.S. Appl. No. 15/948,177 dated Mar. 14, 2019, 19 pgs.
Response to Non-Final Office Action filed in U.S. Appl. No. 15/948,177 dated Jun. 6, 2019, 11 pgs.
U.S. Appl. No. 14/789,271, filed Jul. 1, 2015, 117 pgs.
Non-Final Office Action mailed in U.S. Appl. No. 14/789,271 dated Jul. 14, 2017, 36 pgs.
Response to Non-Final Office Action filed in U.S. Appl. No. 14/789,271 dated Oct. 12, 2017, 14 pgs.
Final Office Action mailed in U.S. Appl. No. 14/789,271 dated Feb. 14, 2018, 33 pgs.
Response to Final Office Action filed in U.S. Appl. No. 14/789,271 dated Jul. 16, 2018, 17 pgs.
Non-Final Office Action mailed in U.S. Appl. No. 14/789,271 dated Sep. 10, 2018, 30 pgs.
Amendment and Response to Non-Final Office Action filed in U.S. Appl. No. 14/789,271 dated Feb. 20, 2019, 16 pgs.
Final Office Action mailed in U.S. Appl. No. 14/789,271 dated Apr. 16, 2019 6 pgs.
Amendment and Response to Final Office Action filed in U.S. Appl. No. 14/789,271 dated Apr. 18, 2019, 13 pgs.
Notice of Allowance mailed in U.S. Appl. No. 14/789,271 dated May 16, 2019, 8 pgs.
Examination Report mailed in Australian Patent Application No. 2015412569 dated Jan. 31, 2019, 4 pgs.
Office Action mailed in Canadian Patent Application No. 3,002,517 dated Jan. 30, 2019, 6 pgs.
Examination Report mailed in European Patent Application No. 15787829.9 dated Apr. 8, 2019, 8 pgs.

* cited by examiner

HINT MODEL UPDATING USING AUTOMATED BROWSING CLUSTERS

FIELD

Embodiments relate generally to network communications performance, and, more particularly, to hint model updating using automated browsing clusters.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of resources (e.g., page objects) and multiple request/response round-trip communications from the user system to one or more web servers that are providing resources for the web page. Additionally, each resource may be associated with a number of different phases as part of the inclusion of the resource (or an object associated with the resource) in a web page that is presented to a user. Each resource that is part of a web page and each phase associated with each resource may contribute to an overall page load time that is experienced by a device user as delay. Various techniques permit information to be sent to browsers regarding the resources used to render a web page ("hints"), and the browsers can use those hints to improve the loading time for that web page.

BRIEF SUMMARY

Among other things, systems and methods are described for improving prefetch hinting by using automated browsing clusters to generate and update hinting models used for machine-generated hints. Some embodiments operate in context of client machines having page fetchers (e.g., implemented in web browsers) in communication (e.g., over a communications network) with content server(s) and hinting machine(s). The hinting machine(s) can include browsing clusters that autonomously fetch (e.g., load, render, etc.) web pages in response to update triggers. For example, the update triggers can correspond to web page requests from client computers, scheduled hinting model updates, determinations of outdated and/or incomplete hinting models, etc. As the automated browsing clusters fetch the web pages, they can generate hinting feedback relating to which resources (e.g., data elements) were used to load the web pages, timing relating to loading those resources, etc. The hinting feedback can be used by the hinting machine(s) to generate and/or update hinting models, which can be used for machine-generation of hints. The hints can be provided to client computers (e.g., and the automated browsing clusters) to improve page load timing and/or provide other features.

Some embodiments of the hinting machine(s) can provide preliminary hinting functionality to client computers in response to hinting requests (e.g., web page requests), for example, when hinting models for the requested web page are insufficient (e.g., unavailable, outdated, or the like). For example, when a client machine requests a web page, the hinting machine(s) can determine whether a sufficient hinting model has already been developed for machine-generating hints for the requested web page. If so, the hinting machine(s) can provide machine-generated hints to the requesting client machine. If not, the hinting machine(s) can machine-generate preliminary hints (e.g., by automated fetching of the requested web page one or more times to generate a preliminary hinting model based on limited obtained hinting feedback). In some implementations, the hinting machine(s) can concurrently trigger the automated browsing cluster to generate (e.g., and/or begin to generate, schedule generation of, update, etc.) a sufficient (non-preliminary) hinting model for the web page from which to subsequently machine-generate hints. For example, the hints based on sufficient hinting models can be provided in response to subsequent requests for the web page.

BRIEF DESCRIPTION OF THE DRAWINGS

The present disclosure is described in conjunction with the appended figures.

Figure 1:
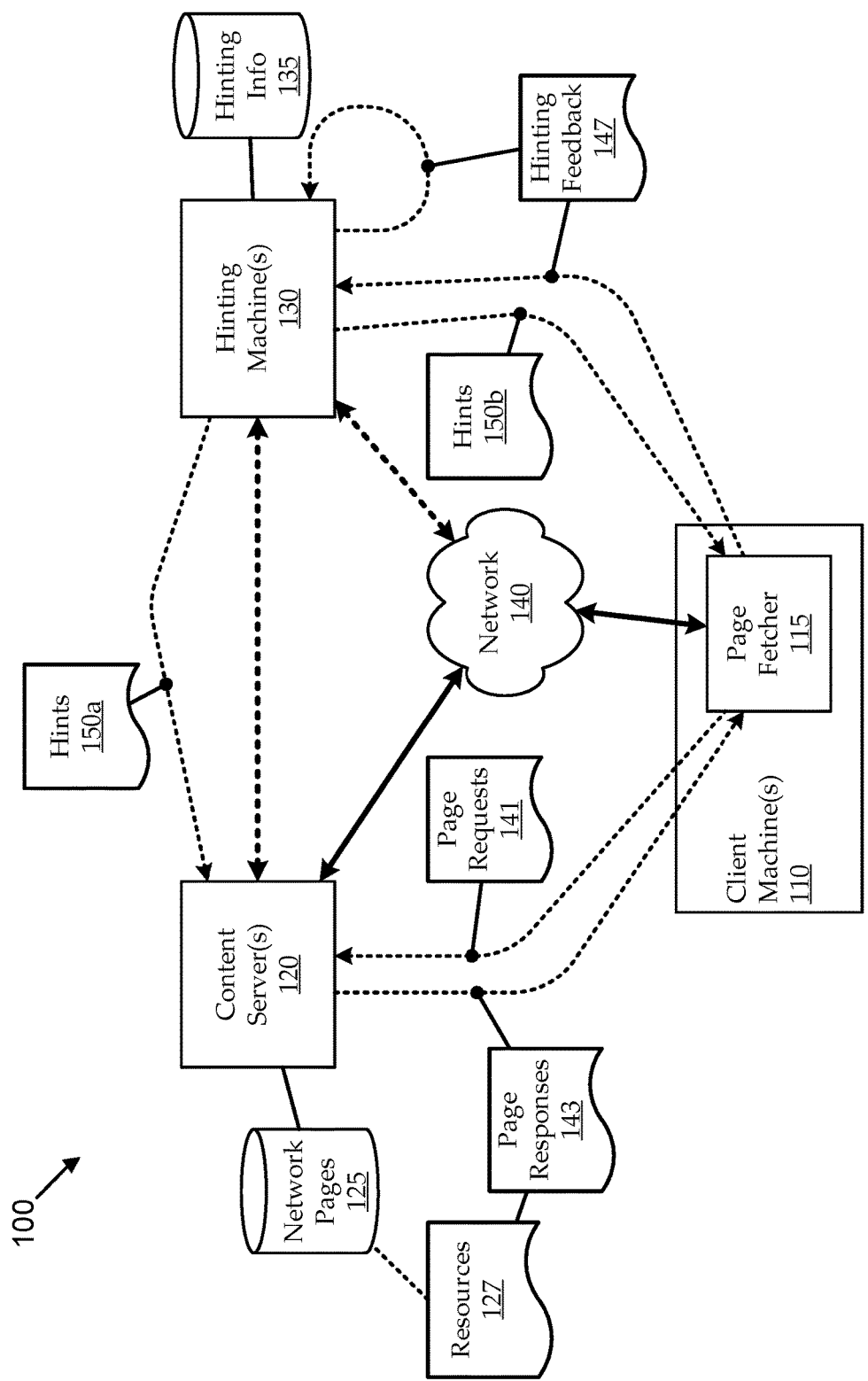
FIG. 1 shows an illustrative communications system environment that provides a context for various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Embodiments operate in context of machine-driven hint generation by automated browsing clusters and provision of those machine-generated hints to client machines. As used herein, an "automated browsing cluster" is intended generally to include any one or more computational platforms that implements one or more "browsing engine" instances to perform page fetching and hinting feedback collection functionality used for machine-generation of hints. Each browsing engine instance can be implemented as a full web browser application, a set of scripts for fetching page resources and collecting page load timing information, a set of "bots" for crawling web pages and generating hinting feedback, and/or in any other suitable manner. The computational platforms and/or the browsing engine instances of the automated browsing cluster can be implemented according to a collocated architecture, a distributed architecture, a cloud-based architecture, and/or any other suitable architecture. For example, some embodiments are described herein as implementing the automated browsing cluster as part of a "hinting back-end." Use of the term "back-end" is intended only to add clarity to certain functional groupings, and is not intended to limit the architectures of those embodiments or the location of the automated browsing cluster (e.g., the "back-end" can be collocated with other hinting machine functions, accessible to those other functions via one or more networks, and/or implemented in any other suitable manner).

As used herein, a "client" or "client machine" is generally intended to include any computational platform involved in a web transaction, such as rendering a web page, and is not intended to be limited to any particular network architecture, protocol, etc. For example, in some implementations, a client machine can interact with a server machine (e.g., a hinting machine) in a "client-server" context, such as a client-server architecture using client-server types of protocols. Other implementations can operate in a peer-to-peer context, or any other suitable context. In such contexts, a particular machine can act as a client for a particular transaction, and as a server or other function in other transactions (e.g., the same machine can operate as a "client" for one transaction and as a server for another transaction, according to peer-to-peer and/or other protocols).

As used herein, "web page transaction" generally refers to a communication between a client machine and another machine (e.g., a server computer) to transfer a plurality of objects to the client machine which may be presented to a user as part of a web page. As used herein, a "web page" is intended to broadly refer to any type of page sent over a communications network and consisting of multiple page resources. For example, the web page can be a typical web page used in World Wide Web communications, a page (e.g., screen) of an application (e.g., an app, etc.), or any other type of web page. Further, reference to "web" is not intended to be limited to the Internet or the World Wide Web; rather, the "web" can include any public or private communications network. Further, terms like "page fetcher" are not intended to be limited to any particular process in a web browser; rather such terms can refer to any process or set of processes used to load and/or render an end-user experience of a web page and its resources in a browser or other application (i.e., "render" and "load" are used herein to generally express formulating the page using the resources). In one example, the web pages can include web browser pages; the page fetcher can include a web browser; and the resources can include uniform resource locators (URLs), hypertext markup language (HTML) objects, scripts, cookies, and/or other server-side objects used (e.g., needed in some or all instances) by the web browser to render the web pages. In another example, the web pages can include screens of an app (e.g., or any other application); the page fetcher can include the app (e.g., the portion of the app that handles input/output interactions); and the resources can be audio-visual content of the rendered screens.

Embodiments are described in context of "hints," "hinting information," and the like. As used herein, hints generally include any information about resources used to render a web page that are provided to a page fetcher (or any suitable component of a client machine or a proxy system of the client machine) to help improve the page load timing for that web page by that page fetcher. As used herein, the term "resource" refers generally to any of a data element (e.g., a file, script, etc.), a collection of data elements (e.g., a web page, etc.), or an identifier of a data element or collection of data elements (e.g., a uniform resource locator (URL), script call, etc.). In some instances, resources can be embedded in other resources and/or can include collections of other resources. The information about the resources may include a list of all resources requested as part of the transaction, a list of resources needed to present an initial incomplete web page on an output of a client device, a set of cookies (and/or hashed versions of those cookies) associated with the client device or processing operating on the client device, a set of cookies (and/or hashed versions of those cookies) associated with one or more web page resources or client processes, a set of timings associated with each resource, a set of timings associated with the overall page rendering process, a set of relationships between the resources, details associated with cached resources, resource sizes, resource types, resource fingerprints or checksums, resource position on the page, cookie meta-data, redirect chains, alternative content sources user during a transaction such as content delivery networks (CDNs) that may be used for some resources, details of the domains (including number of objects that are expected to be fetched per domain) used during the transaction, secure connection metadata, secure socket layer (SSL) server certificate and/or revocation list information, and/or any other such details.

In various embodiments, after a page fetcher or browsing engine instance has completed loading and/or rendering a web page, it can provide hinting feedback information that can include and/or be used to derive any hinting information for subsequent web page transactions (e.g., including any of the hinting information described above). The feedback information can be captured in any suitable manner, including by a client machine, by a page fetcher operating on a client device, by a web server, by a proxy server in a communication path between a client device and a web server, by an automated page fetcher under control of a hinting service, by browsing engine instances of an automated browsing cluster, by a preliminary hint generator, or by any other device involved with a web page transaction. The hints can be used to improve web page loading times in web page transactions. For example, the improvement can be realized by lowering an overall time from a user selection via the page fetcher to a completed presentation of a web page to a user in response to that selection. This improvement can also be realized by lowering an initial time to presentation of an incomplete version of the web page that may be functional for user purposes. In one potential embodiment, a lowering of the overall time may result from the use of latency information in conjunction with other feedback information to determine how aggressively a page fetcher will attempt to prefetch child resources as part of future instances of the web page transaction.

Examples of hints and feedback information may be found in U.S. patent application Ser. No. 14/729,949, titled "SERVER BASED EMBEDDED WEB PAGE FEEDBACK AND PERFORMANCE IMPROVEMENT"; U.S. patent application Ser. No. 13/372,347, titled "BROWSER BASED FEEDBACK FOR OPTIMIZED WEB BROWS- ING"; U.S. Pat. No. 9,037,638, titled "ASSISTED BROWSING USING HINTING FUNCTIONALITY"; U.S. patent application Ser. No. 14/212,538, titled "FASTER WEB BROWSING USING HTTP OVER AN AGGREGATED TCP TRANSPORT"; U.S. patent application Ser. No. 14/276,936, titled "CACHE HINTING SYSTEMS"; and U.S. patent application Ser. No. 14/729,949, titled "SERVER-MACHINE-DRIVEN HINT GENERATION FOR IMPROVED WEB PAGE LOADING USING CLIENT-MACHINE-DRIVEN FEEDBACK"; each of which is expressly incorporated by reference for all purposes in this application.

Resources used in such a web page may include HTML files, cascading style sheet (CSS) files, image files, video files, or any other such resources. Reference to different instances of a web page transaction refers to the transaction being performed by different client machine at different times, or the same transaction being performed by a single client machine at different times. These different instances of a web page transaction may include variations in the resources that are part of the web page transaction, either due to customization across different client machines, or updates to the web page over time. Further, different web pages and different web page transactions may include resources that are the same or similar. In certain embodiments, feedback information and hints generated for a resource seen in one web page transaction may be applied as hints in a transaction for a separate web page if the root URLs are similar or if there is a sufficient degree of commonality between the sets of resources is used in both web page transactions.

Further, as used herein, "root" refers to an initial portion of a web page transaction that is initiated directly by a user selection or action. For example, a user clicking on a web page link initiates a root request for that link. The root response is the response directly responding to that root request. The root response also includes a root resource. This root resource includes information that enables a page fetcher to identify, either directly or indirectly, the other resources needed to render and present the complete web page. In some instances, the "root" resource can include a primary child resource (e.g., a sub-resource) in an iframe in a page, or the like (e.g., where each of multiple iframes are separately hinted from different content servers).

"Redirect" refers to a response to a root request that directs the requesting client device to a different source for a resource. For example, a client device may send a root request and receive back a redirect response. The client device may then send a redirected child request to the redirect target indicated in the redirect response. In certain embodiments, a response to the redirected child request may then include a feedback script or hints. Thus, while certain embodiments describe operation with a root request and response, in various embodiments, any root, child, or redirected response described herein may include a feedback script as described in the various embodiments herein.

"Child" requests and responses are the follow-on requests and responses that result, either directly or indirectly, from embedded or calculated references to other resources in root resources or other child resources. The child resources, requests, and responses are always one or more steps removed from the user action by a root that directly responds to the user action. Child resources may include references to additional child resources, resulting in a chain of requests and responses. Each of the above requests and responses may be hypertext transport protocol (HTTP) requests and responses including HTTP headers and an associated message. In various embodiments, other communication protocols may be used.

FIG. 1 shows an illustrative communications system environment 100 that provides a context for various embodiments. The communications system environment 100 includes client machine(s) 110, content server(s) 120 (e.g., web servers), and hinting machine(s) 130 in communication over a communications network 140. Network 140 can include any one or more suitable communications networks and/or communications links, including any wide area network (WAN), local area network (LAN), private network, public network (e.g., the Internet), wired network, wireless network, etc. Typically, the communications system environment 100 can include many client machines 110 interfacing with multiple content servers 120 over the communications network 140.

As described herein, according to various embodiments, the content servers 120 can be in communication with one or more hinting machines 130 directly and/or via the communications network 140, and/or the client machines 110 can be in communication with the hinting machines 130 directly and/or via the communications network 140 (e.g., at the direction of the content servers). Some embodiments are directed to improving the loading and rendering of resources that make up web pages, screens of applications, and/or other similar web page contexts. In such a context, it may be typical for a client machine 110 to make a request for a web page that is provided (e.g., hosted) by a content server 120. Loading and rendering the requested web page can involve subsequently requesting and receiving a number (sometimes a large number) of resources that make up the web page (e.g., visual content, audio content, executable scripts, etc.). Loading and rendering of such a web page can be improved by requesting resources at particular times (e.g., by prefetching resources in a particular order, etc.), and the client machine can be instructed as to such improvements using "hints," as described herein. The resources may be identified in the set of hints by URL, by a combination of URL and regular expression, by a script, or by other similar techniques. Loading and rendering of such a web page can also be improved by hints that support pre-resolving domain names, pre-establishing TCP connections, pre-establishing secure connections, predetermining and minimizing the redirect chain and similar functions that can be performed prior to content load that improve overall page load performance. Additionally, the probability that a resource will be needed and the priority it should be given by the browser may be communicated to further improve page load time. Additionally, the various image, video, and document formats that may be associated with a given resource may be sent to the device in advance as hints, thereby allowing the renderer to dynamically adjust to network conditions and constraints and minimize data traffic associated with prefetched resources. Additionally, hints may guide the selection of CDNs, caches, or other server locations so as to improve page load time.

Client machine(s) 110 can be implemented as any suitable computing device having memory resources, processing resources, and network communication resources. For example, the client machines 110 can be desktop computers, tablet computers, laptop computers, mobile phones, personal data assistants, network enabled wearable devices, network enabled home appliances, etc. Each client machine 110 includes one or more page fetchers 115. Page fetcher 115 can include any system implemented in a client machine 110 that enables a web page transaction, and that is used, at least in part, for rendering a web page and presenting it to a user via an output device of the client machine 110.

Content server(s) 120 can generally include any one or more computational environments for serving (e.g., hosting and/or otherwise providing access to) web page content to the client machines 110 via the communications network 140. For example, the content servers 120 can include web servers, content distribution networks (CDNs), caches, or the like. As illustrated, the content servers 120 can include, or be in communication with, one or more data storage systems having web pages 125 stored thereon. As described herein, it is assumed that the web pages 125 are made up of multiple resources 127. For example, loading one of the web pages 125 can involve requesting, receiving, and rendering the resources 127 that make up the web page 125. Some or all of the resources 127 of the web pages 125 served by the content servers 120 can be stored in the data storage systems, or some or all of the resources 127 can be stored remote from the content servers 120.

The one or more hinting machines 130 can be implemented as one or more stand-alone server computers, as part of one or more content servers 120, and/or in any other suitable manner for maintaining and updating hinting information 135 (e.g., according to hinting feedback 147 from client machines 110, according to hints 150 computed from the hinting information 135, etc.). The hinting information 135 can be stored in one or more data stores that are part of, coupled with, or in communication with the hinting machines 130, or in any other suitable manner. Embodiments support many different types of hinting information 135 and hints 150 generated therefrom, including, for example, information relating to which page objects 127 are needed to render the web pages 125, timing information relating to those page objects 127 (e.g., the order and timing by which the page objects 127 should be requested), etc. The hinting information 135 can be maintained, computed, updated, etc. in any suitable manner, including according to the hinting feedback 147 received from one or more client machines 110. Embodiments of the hinting machine 130 apply machine learning techniques to hinting feedback 147 from multiple related web page transactions (e.g., from multiple instances of multiple client machines 110 rendering the same (or sufficiently similar) web pages). Received hinting feedback 147 can be used to refine, hone, update, reinforce, or otherwise improve machine-driven hinting models maintained by the hinting machine 130, thereby facilitating generation and communication of optimized hints.

The client machines 110 can render requested web pages 125 according to hints 150 generated from the hinting information 135 that effectively predict which resources 127 the client machines 110 will need at which times to optimally render the web pages 125; the client machines 110 can actually render the web pages 125 according at least to the received hints 150; the actual rendering of the web pages 125 can be monitored by the client machines 110 to determine which resources 127 were actually used to render the pages according to which timings; and the monitored information can be fed back (i.e., as the hinting feedback 147) to the hinting machines 130 for use in updating the hinting information 135 and refining future hint 150 generation.

Some embodiments generate and handle hints in a manner that is computationally generated (e.g., generated by machine based on feedback and analysis, as opposed to being generated manually by coders based on assumptions). As described herein, such machine-generated hinting can be enhanced by using automated browsing clusters (as part of the hinting machine(s) 130) to repeatedly load web pages, and to generate and communicate their own hinting feedback 147 for use in developing hinting models. Some embodiments of the hinting machine(s) 130 can provide preliminary hinting functionality (e.g., as hints 150) to client machines 110 in response to hinting requests (e.g., web page requests 141), for example, when hinting models for the requested web page are unavailable, outdated, or the like. For example, when a client machine 110 requests a web page, the hinting machine(s) 130 can determine whether there is a usable hinting model for machine-generating hints for the requested web page. If so, the hinting machine(s) 130 can provide machine-generated hints 150 to the requesting client machine 110. If not, the hinting machine(s) 130 can machine-generate preliminary hints 150 (e.g., by automated local fetching of the requested web page one or more times to generate a preliminary hinting model).

In some implementations, the hinting machine(s) 130 can concurrently trigger the automated browsing cluster to generate (e.g., and/or update, etc.) a non-preliminary hinting model for the web page from which to subsequently machine-generate non-preliminary hints 150. For example, the non-preliminary hints 150 can be provided in response to subsequent requests for the web page. Over time, the hinting models can be generated and/or updated based on hinting feedback 147 generated by the automated browsing clusters and/or hinting feedback 147 generated by the client machines 110. For example, some embodiments that exploit automated browsing clusters for hinting feedback 147 generation can be implemented in a way that does not receive hinting feedback 147 from some, or any, of the client machines 110 (e.g., some or all client machines 110 may not be configured to, or capable of, generating hinting feedback 147).

Figure 2:
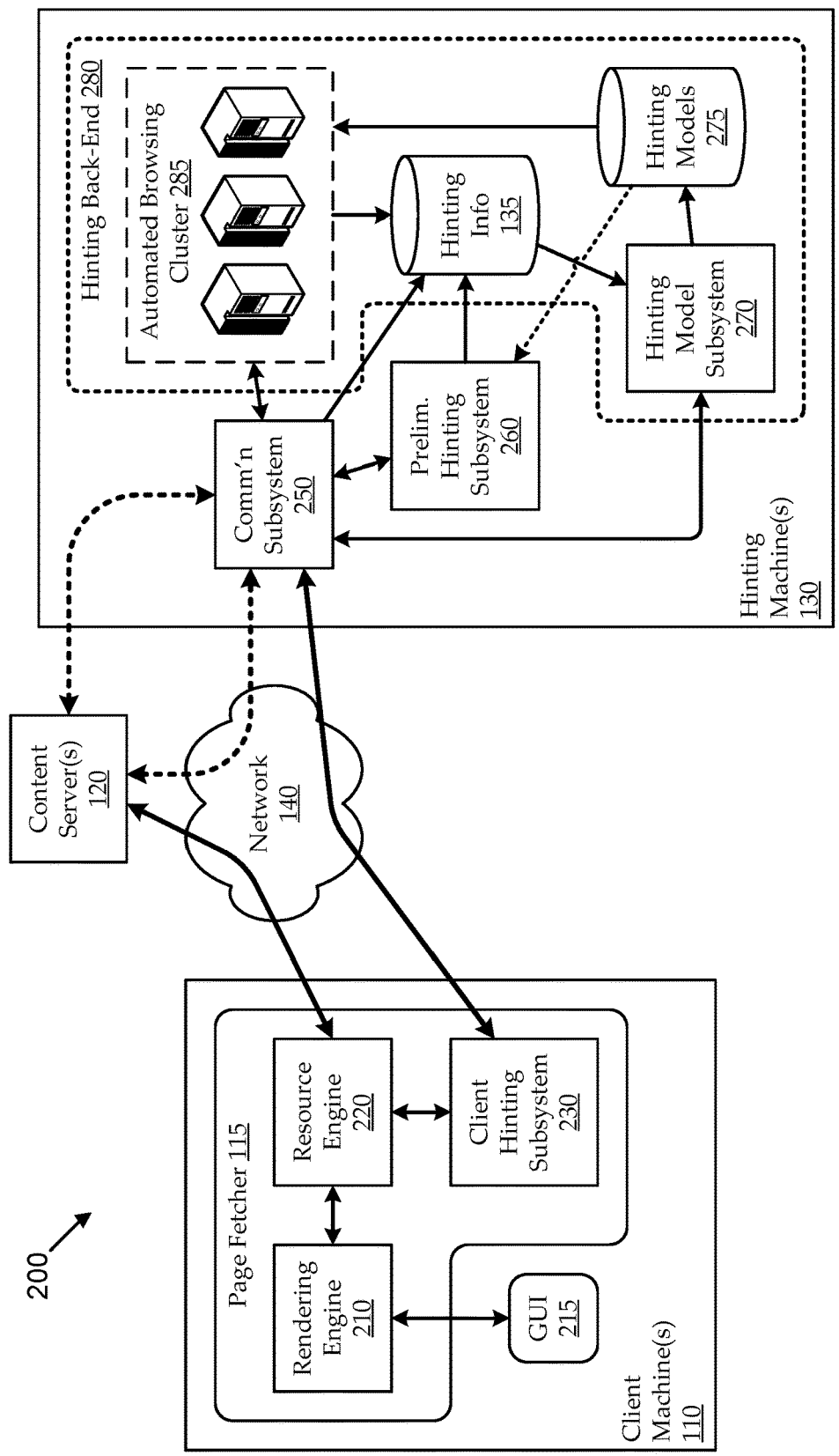
FIG. 2 shows a block diagram of a portion of an illustrative communications environment for implementing hint model updating using automated browsing clusters, according to various embodiments.

FIG. 2 shows a block diagram of a portion of an illustrative communications environment 200 for implementing hint model updating using automated browsing clusters, according to various embodiments. FIG. 2 shows a client machine 110 in communication with a hinting machine 130 over a network 140, which can be an implementation of the system described above with reference to FIG. 1. Some of the descriptions involve communications between components of the client machine 110 and components of the hinting machine 130, however these are intended only as a general illustrations of functionality and connectivity. As described with reference to FIG. 1, and as generally shown in FIG. 2, the hinting machine 130 can be in direct communication (over the network 140) with the client machine 110, in communication with the client machine 110 only via one or more content servers 120 (e.g., where the hinting machine 130 is in communication with the content servers 120 over one or more networks 140 and/or is part of one or more of the content servers 120), in communication with one or more content servers 120 and the client machine 110 over one or more networks 140, etc. For example, hinting functionality can be handled between the client machine 110 and the hinting machine 130 either without involving any content servers 120, only by going through one or more content servers 120, or in any suitable combination.

As illustrated, the client machine 110 can include a page fetcher 115, such as a web browser. Embodiments of the page fetcher 115 can include a rendering engine 210, a resource engine 220, and a client hinting subsystem 230. The rendering engine 210 can render resources of a web page for consumption (e.g., display, etc.) via a graphical user interface (GUI) 215 of the client machine 110. For example, the rendering engine 210 can process HTML code, scripts, page objects, etc. to effectively provide a user experience of web pages via the GUI 215.

When a web page is requested, the resource engine 220 can generate requests for resources of the requested web page, communicate those requests to one or more content servers 120 over the network 140, receive the resources in response to the requests, and process the responses. For the sake of illustration, a user can request a web page via the GUI 215 (e.g., by entering a web address), the resource engine 220 can obtain some or all of the resources needed to render the requested web page (e.g., according to HTML code, scripts, cookies, page objects, etc.), and the rendering engine 210 can process the obtained resources to effectively provide a user experience of the requested web page via the GUI 215 (by rendering the web page using the resources).

Embodiments of the page fetcher 115 can exploit hints, as described herein, using the client hinting subsystem 230. Hinting functionality can be exploited at any or all of a number of stages in a web transaction. One stage is a web page request stage, during which various resource requests can be made to one or more content servers 120 (e.g., by the resource engine 220), and requests comparable to those resource requests can be made to the client hinting subsystem 230 for hints relating to those resources (e.g., by the client hinting subsystem 230). For example, in response to a user requesting a web page, the resource engine 220 can begin requesting URLs (e.g., the root URL and child URLs), and the client hinting subsystem 230 can issue one or more requests indicating those URLs to the hinting machine 130 seeking relevant hints. Another stage is a feedback stage. While the resources for a web page are being loaded, while the page is being rendered, etc., the client hinting subsystem 230 can collect feedback information, as described above (e.g., information on which resources are involved in rendering the web page, timing information relating to the resources, etc.). After the web page has been rendered by the rendering engine 210 (or during rendering, after presentation to the user via the GUI 215, after multiple pages have been rendered and feedback has been aggregated, or at any other suitable time), the client hinting subsystem 230 can send the hinting feedback to the hinting machine 130 for use in generating future hints for the web page and/or for the resources (e.g., for any web pages that invoke those resources). As described herein, some implementations of the client hinting subsystem 230 exploit hints, but do not provide hinting feedback (i.e., they exploit hints generated according to hinting feedback generated by the hinting machine(s) 130 and/or other client machines 110).

As illustrated, embodiments of the hinting machines 130 can include a communications subsystem 250, a preliminary hinting subsystem 260, and a hinting back-end 280. Embodiments of the communications subsystem 250 can facilitate communications functionality between the hinting machine(s) 130 and client computers 110, and between the hinting machine(s) 130 and content servers 120. For example, the communications subsystem 250 can interact with any suitable protocols, physical and/or logical ports, datagram formats, and/or any other functionality for communicating over public and/or private networks, wired and/or wireless networks, local and/or remote networks, secure and/or unsecured networks, etc. In various embodiments, the communications subsystem 250 can communicate (e.g., send and/or receive) and handle hinting requests and hinting feedback with client machines 110, automated browsing clusters 285, etc. Some embodiments of the communications subsystem 250 can also handle communication of resources and the like from content servers 120 for use by the automated browsing clusters 285. Though shown as a single component of the hinting machine 130 disposed outside the hinting back-end 280, embodiments of the communications subsystem 250 can be implemented in multiple components distributed in various locations. For example, some implementations of the automated browsing clusters 285 have local instances of portions of the communications subsystem 250 by which to communicate with content servers 120, other components of the hinting machine(s) 130, etc.

Embodiments of the hinting back-end 280 can include a hinting model subsystem 270, a hinting information store 135, and a hinting models data store 275. The hinting models data store 275 and the hinting information store 135 can be implemented in a same data store or in multiple data stores that are in one or more locations. The data stores can include any suitable machine-readable storage. In general, embodiments of the hinting information store 135 can store any type of hinting feedback information from which hinting models can be generated. For example, the hinting information can include page load timing information, information about whether and how resources are rendered as part of loading a web page, statistics and/or trends relating to resource loading over time, etc. Embodiments of the hinting model subsystem 270 can use the hinting information stored in the hinting information store 135 to generate hinting models. The hinting models can be stored in the hinting models data store 275 and can include any information for informing prefetching of resources used to render associated web pages.

Embodiments of the hinting machines 130 can generate the hinting information used in machine-generation of hints in various ways. As illustrated, some embodiments can obtain hinting information from client machines 110, automated browsing clusters 285, and/or a preliminary hinting subsystem 260. Receipt of hinting information from client machines 110 is described above. For example, after a page fetcher 115 of a client machine 110 loads a web page (e.g., or during loading, or at any suitable time), the client hinting subsystem 230 can communicate hinting feedback to one or more hinting machines 130 relating to resource loading with respect to the web page. The hinting feedback information provided by the client machine 110 can be received by the communications subsystem 250 and stored in the hinting information store 135. Upon storage in the hinting information store 135, or at any other suitable time, the hinting information can be used by the hinting model subsystem 270 to generate a new hinting model for storage in the hinting models data store 275 and/or update (e.g., repair, confirm, replace, and/or otherwise affect) a stored hinting model associated with the web page.

Hinting information can also be generated by, and received from, an automated browsing cluster 285. The automated browsing cluster 285 can include one or more browsing engine instances that can be implemented as a full web browser, a set of browser scripts, one or more "bots", and/or in any other suitable manner. In some implementations, the automated browsing cluster 285 can include (or emulate) multiple, different browsing environments, such as different browser brands, mobile versus desktop versions of a browser, different versions of browsers, browsers having different sets of plugins (e.g., different levels of support for script parsing, handling certain file types, etc.), etc. The automated browsing cluster 285 can autonomously load a web page (or part of a web page), one or more times and can gather and/or generate hinting feedback in accordance with the loading. For example, one or more browsing engine instances of the automated browsing cluster 285 can load a particular web page multiple times (e.g., in parallel) to generate hinting feedback relating to loading behavior of the web page at a particular time, loading behavior of the web page over an extended timeframe, loading behavior of the web page over a range of browser types, etc. The types of hinting feedback generated by the automated browsing cluster 285 can be the same as, or different from, the types of hinting feedback generated by client machines 110. At any suitable time (e.g., after each load of a web page, after multiple loads of a web page, periodically, etc.), the automated browsing cluster 285 can communicate the hinting feedback to the hinting information store 135 (e.g., directly, via the communications subsystem 250, or in any other suitable manner). The hinting information can be used by the hinting model subsystem 270 to generate a new hinting model for storage in the hinting models data store 275 and/or update (e.g., repair, confirm, replace, and/or otherwise affect) a stored hinting model associated with the web page.

At any particular time, hinting models can be stored in the hinting models data store 275 at different levels of sufficiency for different web pages. For example, at a particular time, a hinting model can be present or absent for a particular web page, the hinting model can be incomplete (e.g., information is lacking, fewer than a threshold number of feedback samples has been received, etc.), the hinting model for a web page can be outdated or stale (e.g., if some time has elapsed since hinting information was received for a web page, the hinting model can be considered as having a higher likelihood of inaccuracy), etc. In some embodiments, the hinting models can be generated and/or updated only by the automated browsing cluster 285. In other embodiments, the hinting models can further be generated and/or updated by the client machines 110. For example, in some embodiments, some or all client machines 110 are not configured for, and/or are incapable of, generating and communicating hinting feedback; such that those client machines 110 do not contribute to hinting model generation.

Some embodiments of the hinting machine(s) 130 can determine whether to trigger an update of one or more hinting models. In some implementations, the hinting machine(s) 130 include means for detecting the update trigger for updating a hinting model associated with a web page, where the hinting model is one of a number of hinting models stored in the hinting models data store 275. Triggering an update can drive creation of a new hinting model and/or updating of an existing hinting model. Such a determination can be made in a number of ways by any suitable component of the hinting machine(s) 130 (e.g., by the hinting model subsystem 270). In some instances, an update is triggered when there is a request for a web page by a client computer 110. For example, when a client computer 110 requests a web page, embodiments can determine (e.g., by consulting the hinting model subsystem 270) whether a sufficient hinting model is present in the hinting models data store 275. If so, machine-generated hints can be provided back to the client machine 110 for use in prefetching resources in association with loading the requested web page. If there is no sufficient hinting model in the hinting models data store 275, the hinting model subsystem 270 can direct generation and/or updating of a hinting model. This can involve directing the automated browsing cluster 285 to generate hinting feedback and/or generating a preliminary hinting response, as described more fully below.

In other instances, an update is triggered according to a schedule or any other directive (e.g., a human or automated command communicated to the hinting machine(s) 130). Implementations of the hinting model subsystem 270 can maintain a schedule by which to direct the automated browsing cluster 285 to crawl certain web pages. For example, the schedule can be set to ensure that hinting feedback is received from each web page (e.g., each web page for which a hinting model is stored in the hinting models data store 275) with at least a minimum frequency. Some such schedules can account only for hinting feedback received from the automated browsing cluster 285, while other such schedules can account for hinting feedback received from client computers 110 (i.e., the schedule can be static or dynamic). Further, the schedule can account for additional types of information, such as how often particular web pages (or types of web pages) are updated, available infrastructure capacity (e.g., to avoid taking excessive bandwidth and/or other inefficiencies, the schedule may account for off-peak usage times, etc.), etc.

In response to determining that an update is desired, the hinting model subsystem 270 or any other suitable component of the hinting machine(s) 130 can direct the automated browsing cluster 285 to generate sufficient hinting feedback for hinting model generation. For example, hinting model subsystem 270 can issue an update trigger in response to determining to update a particular hinting model associated with a particular web page. In response to the update trigger, the automated browsing cluster 285 can fetch the web page (e.g., one or multiple times, according to one or multiple browser environments) to generate page fetching data for the resources used to render the particular web page. In some embodiments, the page fetching data can be used to generate hinting feedback, which can be stored in the hinting information store 135. For example, embodiments of the hinting machine(s) 130 include means for fetching the web page, in response to detecting the update trigger, to generate page fetching data for the resources used to render the web page; means for generating hinting feedback according to the page fetching data; and means for communicating the hinting feedback to the hinting server for updating of the hinting model by the hinting server. The stored hinting information can be used by the hinting model subsystem 270 to generate one or more hinting models, which can be stored in the hinting models data store 275. At some subsequent time, if another request is received for the web page from a later-requesting client (the same or a different client machine 110), the generated and/or updated hinting models can be used to machine-generate hints, which can be provided to the later-requesting client.

Some embodiments provide a preliminary hinting response to requesting client machines 110 in the event that a sufficient hinting model is unavailable at the time of a web page request. For example, when the communications subsystem 250 receives a web page request, it can consult the hinting model subsystem 270 to determine whether there is a sufficient hinting model for the requested web page. If not, it can still be desirable to machine generate hints, even if those hints are based on limited hinting information. Embodiments of the hinting machine(s) 130 include a preliminary hinting subsystem 260 that can machine generate hints based on limited hinting information. For example, the preliminary hinting subsystem 260 can include one or more browsing engine instances, which can be similar or identical to the browsing engine instances of the automated browsing cluster 285. The preliminary hinting subsystem 260 can load some or all of the requested web page, one or more times, to generate preliminary hinting feedback information. The preliminary feedback information can be used to generate a preliminary hinting model and, accordingly, a preliminary hinting response. Implementations generate the preliminary hinting response in such a way that the response can be communicated to the requesting client machine 110 substantially in real time. As used in this context, "substantially in real time" is intended to implicate a timing that is rapid enough to be useful to the requesting client machine 110 in affecting prefetching of resources in association with the web page request that caused the preliminary response to be generated (e.g., similar to the timing had a sufficient hinting model been available at the time of the request).

Figure 3A:
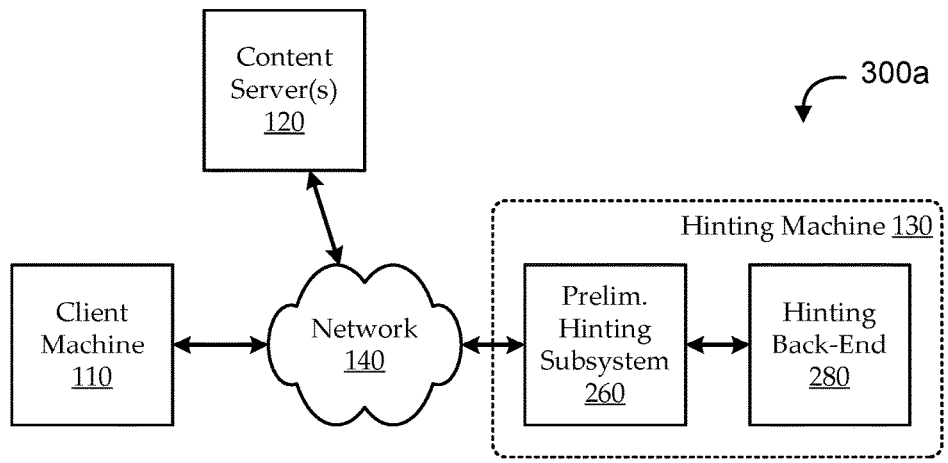
FIG. 3A shows an illustrative architecture for implementing machine-generation of hints using automated server clusters, according to various embodiments.
Figure 3B:
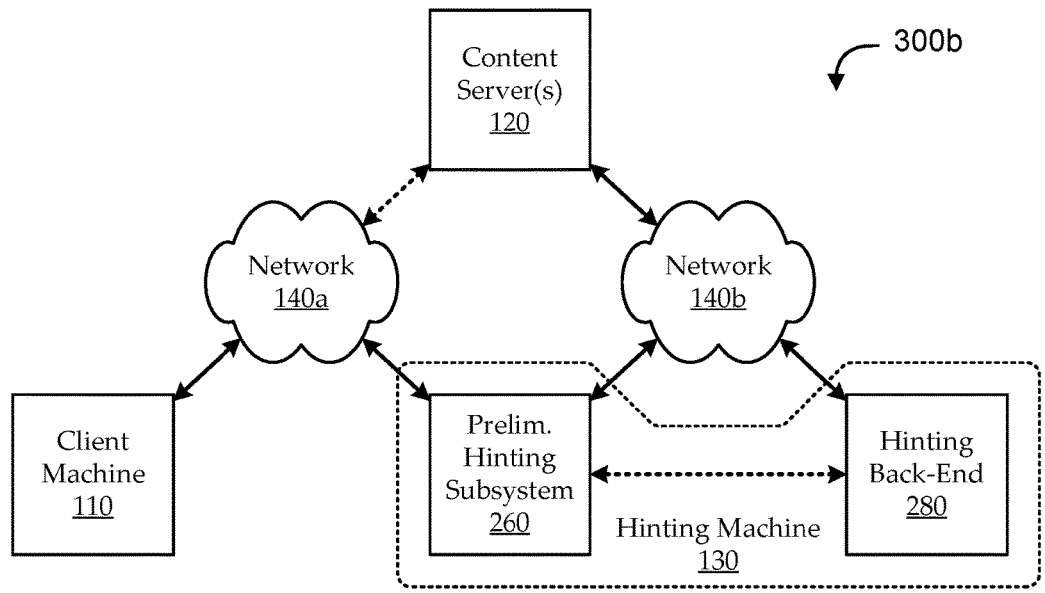
FIG. 3B shows another illustrative architecture for implementing machine-generation of hints using automated server clusters, according to various embodiments.

FIGS. 1 and 2 show the client machines 110 on a different side of the network 140 from all the various components of the hinting machines 130. However, this illustrated architecture is intended only to simplify the description, and is not intended to limit possible alternate implementations. For example, though the automated browsing cluster 285 is shown as part of the hinting back-end 280, portions of the automated browsing cluster 285 (e.g., one or more automated browsing engine instances) can be implemented in the preliminary hinting subsystem 260, in one or more client machines 110, etc. (e.g., or the hinting back-end 280 can be collocated with and/or remote from the preliminary hinting subsystem 260). FIGS. 3A and 3B show various alternative architectures by which systems, such as those described in FIGS. 1 and 2, can be implemented.

Turning first to FIG. 3A, an illustrative architecture 300a is shown for implementing machine-generation of hints using automated server clusters, according to various embodiments. The architecture 300a includes a client machine 110 in communication with a hinting machine 130 and content server 120 over a network 140. This architecture 300a is similar to the ones shown in FIGS. 1 and 2. For example, the client machine 110 is disposed on a client side of the network 140, and both preliminary hinting functionality of a preliminary hinting subsystem 260 and non-preliminary hinting functionality of hinting back-end 280 subsystems are disposed on a provider side of the network (e.g., in a common node, in multiple nodes of a backhaul network, etc.).

FIG. 3B shows another illustrative architecture 300b for implementing machine-generation of hints using automated server clusters, according to various embodiments. The architecture 300b includes a client machine 110 in communication with a hinting machine 130 and content server 120 over a first network 140a, and various portions of the hinting machine 130 in communication over a second network 140b. As illustrated, the preliminary hinting subsystem 260 can be separated from the hinting back-end 280 by the second network 140b. For example, some or all of the hinting back-end 280 (e.g., the automated browsing cluster 285) can be cloud-based, or otherwise remote or distributed.

In some such architectures 300b, the first network 140a is relatively higher latency (e.g., and/or higher reliability, etc.) than the second network 140b. For example, the first network is a satellite network, and the second network is a backhaul network. According to certain such architectures, client machines 110 communicate with content servers 120 only via one or more nodes of the provider-side infrastructure, and some or all of the hinting machine 130 can be disposed in those one or more nodes. For example, the client machine 110 (e.g., the page fetcher) can be configured as a proxy client, and the hinting machine 130 (e.g., the communication subsystem) can be disposed in a gateway or core node of the network and configured as a proxy server; so that all web page requests from the client machine 110 pass through (e.g., are intercepted by, etc.) at least a portion of the hinting machine 130. In such implementations, the preliminary hinting subsystem 260 can fetch resources of the requested web page from the content servers 120 more quickly via the backhaul network than can the client machines 110 via the satellite network (e.g., particularly given multiple round trips of resource requests, resource responses, etc.). With faster fetching of the resources, in some instances, the preliminary hinting subsystem 260 can generate and communicate the preliminary hinting response to the requesting client machine 110 in time to provide useful prefetching hints (even if those hints are based on limited, preliminary hinting information).

Figure 4:
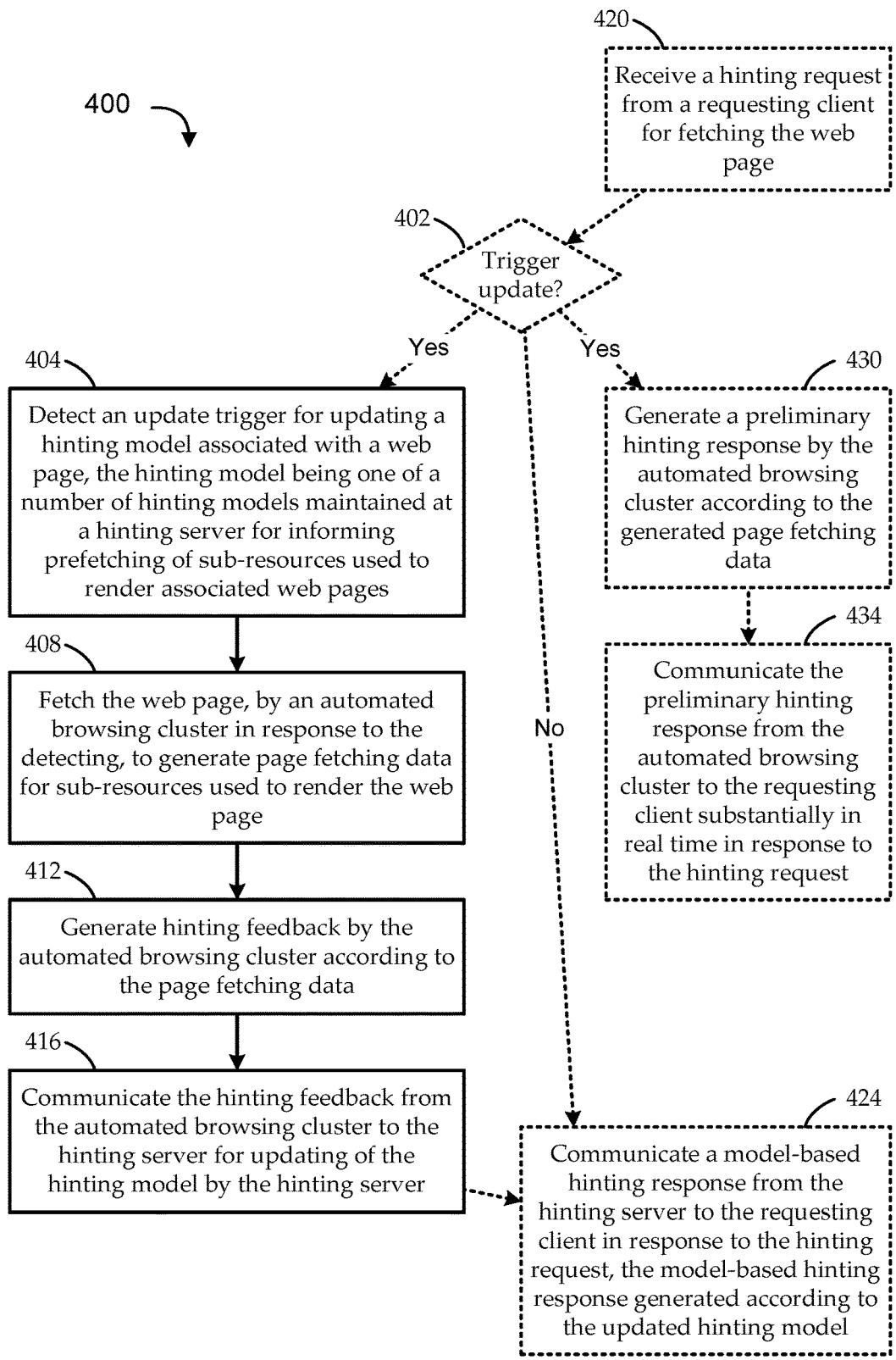
FIG. 4 shows a flow diagram of an illustrative method for machine-generation of hints using automated browsing clusters, according to various embodiments.

FIG. 4 shows a flow diagram of an illustrative method 400 for machine-generation of hints using automated browsing clusters, according to various embodiments. Embodiments of the method 400 can be implemented by any suitable system, such as the systems described with reference to FIGS. 1-3B. The method 400 can begin at stage 404 by detecting an update trigger for updating a hinting model associated with a web page. The hinting model can be one of multiple hinting models maintained at the hinting server for informing prefetching of resources used to render associated web pages. In some embodiments, a determination can be made as to whether to trigger an update at stage 402, and the update trigger can be detected at stage 404 in response to determining to trigger an update at stage 402.

Determining whether to trigger an update at stage 402 can be based on a number of trigger events. One such event is a pre-scheduled model update. For example, a schedule of model updates can be maintained by the hinting server and/or any other suitable location, and update triggers can be provided according to the schedule. Another such event is a determination of an outdated, unavailable, or otherwise insufficient hinting model. For example, the hinting server can determine whether a hinting model for a web page is sufficient for use in machine generation of hints in response to a client request for that web page, in response to automated web crawling of multiple web pages, or in any other suitable way. Some implementations determine insufficiency only based on presence or absence of a hinting model, while other implementations can use various metrics to determine whether an existing hinting model is sufficient (e.g., based on a threshold number of hinting feedback samples that has been received for the web page and/or for particular resources on the web page, etc.). Another such event is receipt of a client request for a web page. For example, at stage 420, a hinting request can be received from a client for fetching of a web page. The request can be treated as an update trigger, or an update trigger can be generated in response to receiving the request. For example, an update trigger can be detected at stage 404 after a hinting request is received at stage 420, and a determination is made at stage 402 to trigger an update because the request is for a web page having an insufficient hinting model. In some embodiments, if it is determined not to trigger an update at stage 402 (e.g., a hinting request is received at stage 420 invoking a sufficient hinting model), a model-based hinting response can be communicated at stage 424 (e.g., from the hinting server to the requesting client in response to the hinting request). For example, the model-based hinting response can be generated according to the sufficient and/or updated hinting model.

At stage 408, in response to detecting the update trigger at stage 404, embodiments can fetch the web page, by the automated browsing cluster, to generate page fetching data for resources used to render the web page. For example, the web page can be fetched multiple times by one or more browsing instances of the automated browsing cluster. In some implementations, the web page is fetched in accordance with different browsing environments (e.g., different web browsers, mobile versus desktop browsers, browsers having different script parsing capabilities, etc.). The generated page fetching data can include any useful information about resource loading in relation to web page loading. For example, the page fetching data can include resource load timing information, rendering information (e.g., information relating to the positions of resources on the web page, etc.), etc.

Hinting feedback can be generated by the automated browsing cluster at stage 412 according to the page fetching data. At stage 416, the hinting feedback can be communicated from the automated browsing cluster to the hinting server for updating of the hinting model by the hinting server. In some embodiments, the hinting model is updated according to the hinting feedback, and, at stage 424, a model-based hinting response can be communicated according to the updated hinting model.

In some embodiments, when a hinting request is received at stage 420, and it is determined to trigger an update at stage 402, a preliminary hinting response can be generated by the hinting server at stage 430. For example, an engine of the hinting server (e.g., the automated browsing cluster and/or any suitable component) can fetch the web page one or more times to generate preliminary hinting feedback, a preliminary hinting model, and a preliminary hinting response in accordance with the preliminary hinting model. In some such embodiments, the preliminary hinting response can be communicated at stage 434 from the automated browsing cluster to the requesting client substantially in real time in response to the hinting request (i.e., without appreciable delay, so that it is usable by the client for improving fetching of the web page as part of web transaction corresponding to the received hinting request).

Figure 5:
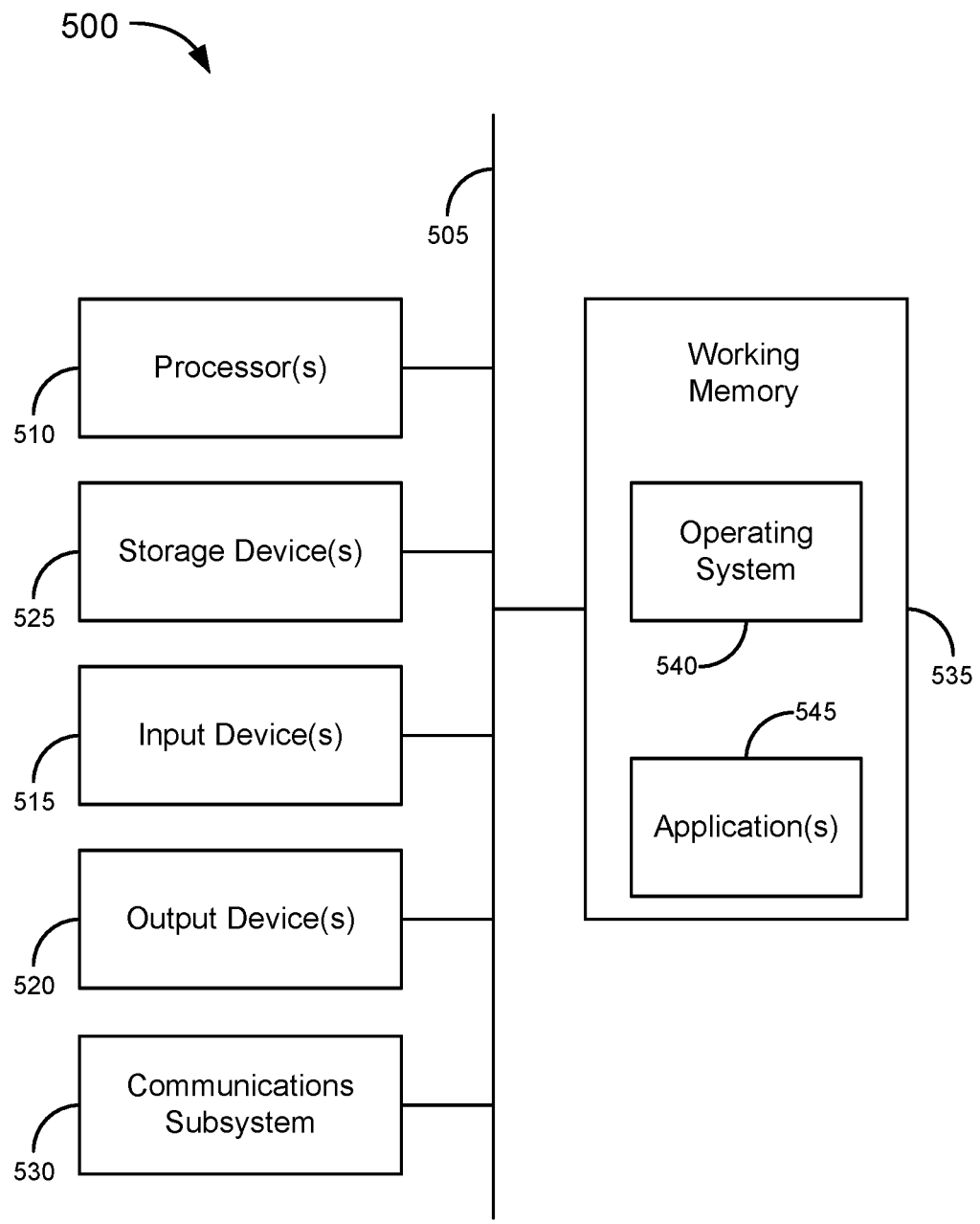
FIG. 5 provides a schematic illustration of one embodiment of a computer system that can perform the methods of the invention, as described herein, and/or can function, for example, as any part of client machine(s), content server(s), hinting machine(s) 130 or any other such computer or device.

FIG. 5 provides a schematic illustration of one embodiment of a computer system 500 that can perform the methods of the invention, as described herein, and/or can function, for example, as any part of client machine(s) 110, content server(s) 120, hinting machine(s) 130, or any other such computer or device. It should be noted that FIG. 5 is meant only to provide a generalized illustration of various components, any or all of which may be utilized, as appropriate. FIG. 5 therefore broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including, without limitation, one or more general-purpose processors and/or one or more special-purpose processors (such as digital signal processing chips, graphics acceleration chips, and/or the like); one or more input devices 515, which can include, without limitation, a mouse, a keyboard, touchscreen, and/or the like; and one or more output devices 520, which can include, without limitation, a display device, a printer, and/or the like.

The computer system 500 may further include (and/or be in communication with) one or more storage devices 525, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 500 might also include a communications subsystem 530, which can include, without limitation, a modem, a network card (wireless or wired), an infrared communication device, a wireless communication device, and/or chipset (such as an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more applications 545, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 500, and/or might take the form of source and/or installable code which, upon compilation and/or installation on the computer system 500 (e.g., using any of a variety of generally available compilers, installation programs, compression/decompression utilities, etc.), then takes the form of executable code. In certain embodiments, this may include page fetcher functionality and may include separate page fetcher modules as part of this page fetcher functionality executed by a process to enable display of a web page on an output device 520 of such a computer system 500.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms including, but not limited to, non-volatile media. Non-volatile media includes, for example, optical or magnetic disks, such as the storage device(s) 525. Common forms of physical and/or tangible computer-readable media include, for example, a flexible disk, hard disk, magnetic tape or any other magnetic medium, a CD-ROM or any other optical medium, solid-state circuit based memory or any other memory chip or cartridge, or any other medium from which a computer can read instructions and/or code. Various forms of machine-readable media may be involved in carrying one or more sequences of one or more instructions to the processor(s) 510 for execution. Merely by way of example, the instructions may initially be carried on a memory of a remote computer. A remote computer might load the instructions into its dynamic memory and send the instructions as signals over a transmission medium to be received and/or executed by the computer system 500.

The communications subsystem 530 (and/or components thereof) generally will receive the signals, and the bus 505 might then carry the signals (and/or the data, instructions, etc., carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
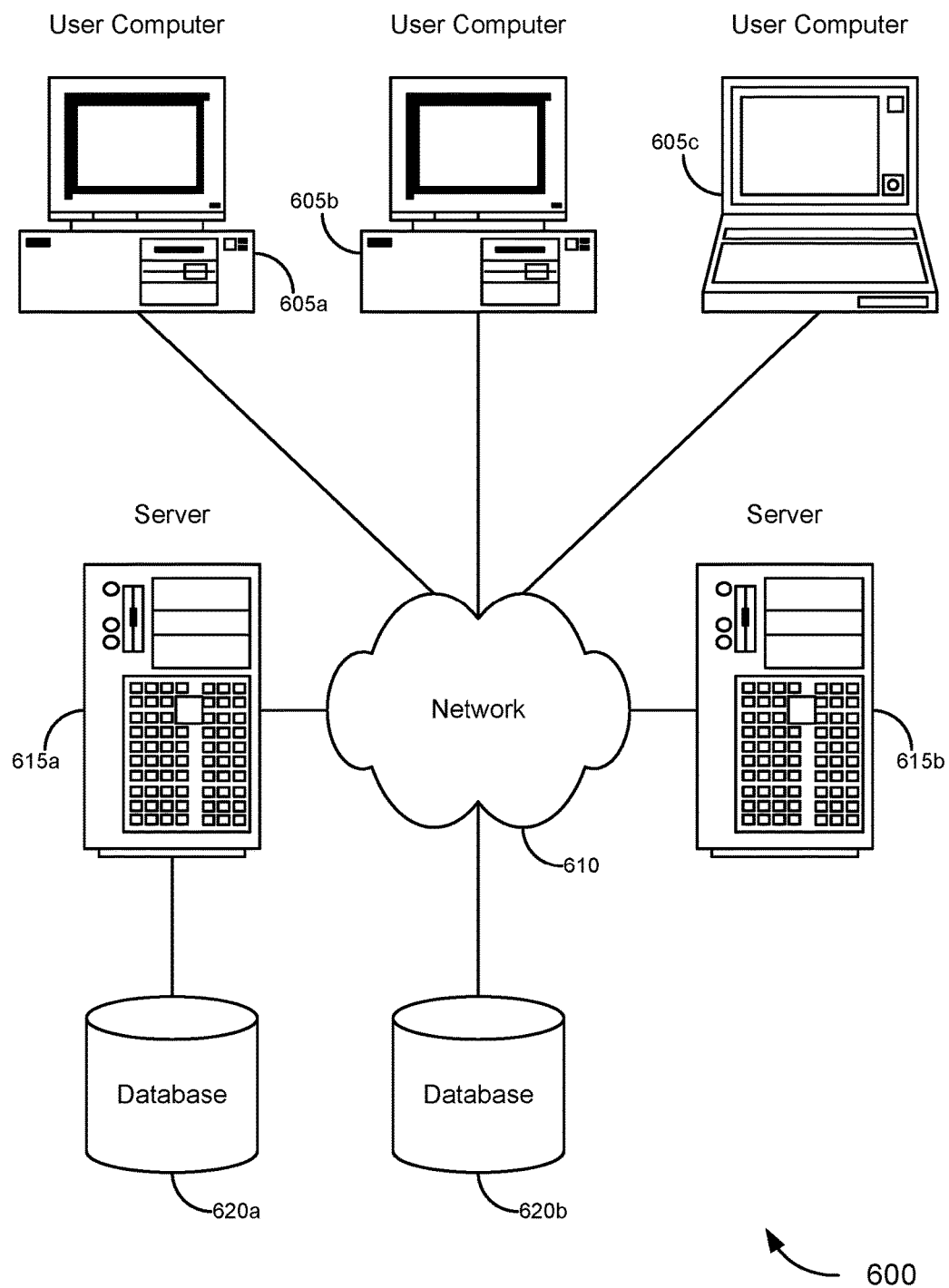
FIG. 6 illustrates a schematic diagram of a network system that can be used in accordance with one set of embodiments.

FIG. 6 illustrates a schematic diagram of a network system 600 that can be used in accordance with some embodiments. In such embodiments, the network system 600 may represent any number of client and server devices that enable content to be communicated from content providers to user systems as part of web page transactions across a network. The system 600 can include one or more user computers 605, such as computers for implementing client machine(s) 110 of FIG. 1. The user computers 605 can be general-purpose personal computers and/or can have any of a variety of applications, including one or more applications configured to perform methods of the invention, as well as one or more office applications, database client and/or server applications, and page fetcher applications. Alternatively, the user computers 605 can be any other electronic device, such as a thin-client machine, Internet-enabled mobile telephone, tablet computer, phablet, wearable device, Internet-enabled appliance, and/or personal digital assistant (PDA) capable of communicating via a network (e.g., the network 610 described below) and/or displaying and navigating web pages or other types of electronic documents. Although the exemplary system 600 is shown with three user computers 605a-c, any number of user computers can be supported.

Certain embodiments of the invention operate in a networked environment, which can include a network 610, such as for implementing the network 140 of FIG. 1. The network 610 can be any type of network familiar to those skilled in the art that can support data communications using any of a variety of commercially-available protocols, including, without limitation, TCP/IP, UDP/IP, SNA, IPX, and the like. Merely by way of example, the network 610 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, or any other wireless protocol; and/or any combination of these and/or other networks.

Embodiments of the invention can include one or more servers 615 (or similar types of computational systems). Embodiments of the servers 615 can be used to implement the content server(s) 120 and/or the hinting machine(s) 130. As described above, the hinting machine(s) 130 can also be part of one or more content servers 120 and/or part of one or more client machines 110, which can be implemented as one or more of the servers 615. Each of the servers 615 may be configured with an operating system, including, without limitation, any of those discussed above, as well as any commercially (or freely) available server operating systems. Each of the servers 615 may also be running one or more applications, which can be configured to provide services to one or more user computers 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, script servers, and the like. In some embodiments of the invention, the web server may be configured to serve web pages that can be operated within a page fetcher on one or more of the user computers 605 to perform methods of the invention. In certain embodiments, the servers 615 may also include CDN devices which provide similar or identical content from an alternate server than the primary content server which is a source for particular objects in a web page transaction.

The servers 615, in some embodiments, might include one or more application servers, which can include one or more applications accessible by a client running on one or more of the user computers 605 and/or other servers 615. Merely by way of example, the server(s) 615 can be one or more general-purpose computers capable of executing programs or scripts in response to the user computers 605 and/or other servers 615, including, without limitation, web applications (which might, in some cases, be configured to perform methods of the invention). Merely by way of example, a web application can be implemented as one or more scripts or programs written in any suitable programming language. The application server(s) can also include database servers which can process requests from clients (including, depending on the configurator, database clients, API clients, page fetchers, etc.) running on a user computer 605 and/or another server 615. In some embodiments, an application server can create web pages dynamically for displaying the information in accordance with embodiments of the invention, such as information displayed as part of various page fetchers discussed herein. Data provided by an application server may be formatted as web pages (e.g., comprising HTML, scripts, etc.) and/or may be forwarded to a user computer 605 via a content server 120. Similarly, a content server 120 can receive web page requests and/or input data from a user computer 605 and/or forward the web page requests and/or input data to an application server. In some cases, a content server 120 may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620, such as for implementing a hinting information data store 135, a hinting model data store 275, and/or any other suitable data store used by systems and methods of various embodiments. Such databases may include stores of web transaction history and hints derived from this web transaction history. Any supporting details related to creation of such hints may additionally be stored in such a database. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605 or servers 615a,b, so long as the database 620b can be in communication with one or more of these (e.g., via the network 610). In a particular set of embodiments, a database 620 can reside in a storage-area network ("SAN") familiar to those skilled in the art. Likewise, any necessary files for performing the functions attributed to the computers 605 or servers 615 can be stored locally on the respective computer and/or remotely, as appropriate. In one set of embodiments, the database 620 can be a relational database that is adapted to store, update, and retrieve data in response to SQL-formatted commands. The database might be controlled and/or maintained by a database server, as described above, for example.

In any embodiment described herein, any communication, hypertext transport protocol (HTTP) request or response, web page transaction, portion of a web page transaction, or any combination of any communications in whole or in part that may use HTTP may also be implemented using hypertext transport protocol secure (HTTPS). The use of HTTPS involves encryption and various security measures, and any embodiment described herein may be adapted to implement systems and methods described herein to accommodate the encryption and security associated with HTTPS in a number of ways.

In certain embodiments, proxy devices involved in any communication described herein may be provided with details associated with HTTPS communications in order to enable any proxy device functionality described herein. Such details may be provided by a user device with user consent to enable proxy device or hinting machine device interaction with the user's communications. This may enable decryption of HTTPS communication by the proxy to enable any functionality described herein. Such details to enable decryption may also be provided by a content server or content server operator to enable proxy device interaction with the content provider's communications. For aspects of embodiments described herein relating to client-side functionality or page fetcher functionality, certain embodiments may function with the same implementation described above for proxy devices. This functionality may be used as well with any other server side or content device.

In other embodiments, rather than a proxy decryption of HTTPS communications, a browser on a user device may interact with a proxy device or a hinting machine device, independent of the original HTTPS communication to provide details of the HTTPS communication to the proxy device or hinting machine device. In a user device page fetcher, this may involve the use of a page fetcher module, page fetcher plug-in, or page fetcher with specialized core functionality to observe HTTPS communications before they are encrypted. If needed, the independent communications with the proxy device or hinting machine device may then additionally be subject to security similar to the security used for the original HTTPS communication. For embodiments described herein which may involve integration with content provider systems or reverse proxy systems, HTTPS communication received at the content provider system or reverse proxy may be used as part of the embodiments described herein after the HTTPS communication is decrypted by the content provider system or reverse proxy. Thus, any "observing" or "identifying" functionality described herein may be performed with HTTPS communications for client machines, proxy devices, and content provider devices. Similarly, any embodiment described herein may be implemented with other secure connection and communication systems or protocols in addition to HTTPS described above.

Certain embodiments described herein refer to proxy devices or proxy systems. As described herein, proxy devices may be one or more devices operating as part of a system to intercept communications between user devices and content devices. Such proxies may be transparent to the user and content devices, or may be part of a multi-step communication path which is apparent to user and content devices. In certain embodiments, proxy devices may function as part of a forward proxy system, where communications from a group of user devices are all communicated to a broader network (such as the Internet) via the forward proxy system. In alternate embodiments, the proxy devices may function as part of reverse proxy systems, where a reverse proxy system operates as an access path to a number of content server devices. It will be apparent that embodiments described herein as including a proxy will apply to both forward proxy systems and reverse proxy systems, and any configuration of a system including a proxy, given appropriate accommodations for the particular system structure.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The terms "one" or "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Similarly, terms, such as "optimize" are not intended to limit embodiments to an optimal approach or result, but rather to express seeking movement toward an optimal result (e.g., to improve, etc.). As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for hint model updating using an automated browsing cluster in communication with a machine-driven hinting server, the method comprising:
    issuing, by the hinting server to the automated browsing cluster, an update trigger for updating a hinting model associated with a web page, the hinting model maintained at the hinting server for informing remotely located web browsers on remotely located client machines of resources to prefetch as part of a future rendering of the web page by any of the web browsers;

fetching the web page, by the automated browsing cluster, in response to the update trigger issued by the hinting server, wherein the automated browsing cluster is located remotely from the web browsers of the client machines;

identifying, by the automated browsing cluster from the fetched web page, page fetching data for resources of the web page;

generating hinting feedback, by the automated browsing cluster, according to the page fetching data; and communicating the hinting feedback from the automated browsing cluster to the hinting server for updating of the hinting model by the hinting server.

2. The method of claim 1, wherein:
the automated browsing cluster is disposed on the hinting server;
the hinting server is separated from each of the web browsers by a communications network;
the issuing comprises a module of the hinting server issuing the update trigger to the automated browsing cluster; and
the communicating comprises the automated browsing cluster communicating the hinting feedback to the module of the hinting server.

3. The method of claim 1 further comprising updating, by the hinting server, the hinting model using the hinting feedback.

4. The method of claim 3, further comprising:
receiving a hinting request from one of the web browsers for hints for rendering the web page; and
communicating a model-based hinting response from the hinting server to the requesting browser in response to the hinting request, the model-based hinting response generated according to the updated hinting model.

5. The method of claim 1, wherein the update trigger corresponds to receipt of a hinting request at the hinting server from one of the web browsers for hints for rendering the web page.

6. The method of claim 5, further comprising:
determining, by the hinting server, in response to the hinting request, that there is not a hinting model for the web page at the hinting server, wherein the hinting server issues the update trigger in response to the determining that there is not a hinting model for the web page at the hinting server;
generating, by the hinting server, a preliminary hinting response from the hinting feedback received from the automated browsing cluster;
communicating the preliminary hinting response from the hinting server to the requesting web browser substantially in real time in response to the hinting request; and
updating the hinting model by creating the hinting model on the hinting server from the hinting feedback.

7. The method of claim 1, wherein the update trigger corresponds to a determination that the hinting model for the web page at the hinting server is incomplete and/or outdated.

8. The method of claim 1, wherein at least one of the resources identified by the automated browsing cluster is a uniform resource locator (URL) of a child resource of the web page.

9. The method of claim 1 further comprising:
rendering, by the automated browsing cluster, the web page fetched by the automated browsing cluster, wherein the page fetching data comprises page rendering data from the rendering of the web page by the automated browsing cluster.

10. The method of claim 9, wherein the page rendering data further comprises identifications of child resources of the web page fetched as part of the rendering of the web page by the automated browsing cluster.

11. The method of claim 10, wherein the page rendering data further comprises load timing information for a plurality of the child resources.

12. The method of claim 1, wherein:
the fetching comprises fetching, by the automated browsing cluster, the web page a plurality of times,
the identifying comprises identifying, by the automated browsing cluster, page fetching data from each of the fetchings of the web page, and
the generating comprises generating the hinting feedback, by the automated browsing cluster, according to the page fetching data identified from each of the fetchings of the web page.

13. The method of claim 12, wherein the fetching further comprises fetching the web page the plurality of times substantially in parallel.

14. The method of claim 1, wherein;
the automated browsing cluster comprises a plurality of web page fetching scripts, each web page fetching script having less than a full functionality of any of the web browsers on the client machines, and
the fetching comprises one of the web page fetching scripts fetching the web page.

15. The method of claim 1, wherein:
the automated browsing cluster emulates a plurality of different web page fetching environments;
the fetching comprises a first fetching of the web page in a first of the web fetching environments and a second fetching of the web page in a second of the web fetching environments, wherein the second web fetching environment is different than the first web fetching environment;
the identifying comprises identifying, by the automated browsing cluster, page fetching data from both the first fetching and the second fetching of the web page; and
the generating comprises generating the hinting feedback, by the automated browsing cluster, according to the page fetching data identified from both the first fetching and the second fetching of the web page.

16. The method of claim 1, further comprising:
scheduling the fetching of the web page by the automated browsing cluster during an off-peak network usage timeframe,
wherein the fetching is according to the scheduling.

17. A machine-driven hint generation system comprising:
a data store that maintains a hinting model for a web page, wherein the hinting model is for informing remotely located web browsers of resources to prefetch as part of a rendering of the web page by any of the web browsers;
a hinting server, in communication with the data store, that operates to issue an update trigger in response to determining to update the hinting model; and
an automated browsing cluster, in communication with the hinting server, that operates, in response to the update trigger from the hinting server to:
fetch the web page;
identify, from the fetched web page, page fetching data for resources of the web page; and
generate hinting feedback according to the page fetching data;

wherein the data store, the hinting server, and the automated browsing cluster are located remotely from the web browsers; and wherein the hinting server issues the update trigger to the automated browsing cluster.

18. The system of claim 17, wherein:

the automated browsing cluster is disposed on the hinting server, a module of the hinting server is configured to issue the update trigger to the automated browsing cluster, and the hinting server is separated from the web browsers by a communications network.

19. The system of claim 17, wherein:

the automated browsing cluster further operates to communicate the hinting feedback to the hinting server; and the hinting server further operates to update the hinting model according to the hinting feedback.

20. The system of claim 19, wherein the hinting server further operates to:

receive a hinting request from one of the web browsers for hints for rendering the web page;

generate according to the updated hinting model a model-based hinting response; and communicate the model-based hinting response to the requesting browser.

21. The system of claim 17, wherein the hinting server further operates to receive a hinting request from one of the browsers for hints for rendering the web page.

22. The system of claim 21, wherein the hinting server further operates to:

upon determining that the hinting model for the web page is not stored in the data store, issue the update trigger;

generate a preliminary hinting response from the hinting feedback; and communicate the preliminary hinting response to the requesting web browser substantially in real time in response to the hinting request; and create the hinting model from the hinting feedback.

23. The system of claim 17, wherein the hinting server further operates to issue the update trigger upon determining that the hinting model in the data store for the web page is incomplete and/or outdated.

24. The system of claim 17, wherein at least one of the resources for which the automated browsing cluster identifies page fetching data is a uniform resource locator (URL) of a child resource of the web page.

25. The system of claim 17, wherein:

the automated browsing cluster further operates to render the fetched web page, and the page fetching data comprises page rendering data from the rendering of the web page by the automated browsing cluster.

26. The system of claim 25, wherein the page rendering data further comprises identifications of child resources of the web page fetched by the automated browsing cluster as part of rendering the web page.

27. The system of claim 26, wherein the page rendering data further comprises load timing information for a plurality of the child resources.

28. The system of claim 17, wherein the automated browsing cluster operates further to:

fetch the web page a plurality of times, identify page fetching data from each of the fetchings of the web page, and generate the hinting feedback according to the page fetching data identified from each of the fetchings of the web page.

29. The system of claim 28, wherein the automated browsing cluster operates further to fetch the web page the plurality of times substantially in parallel.

30. The system of claim 17, wherein the automated browsing cluster comprises a web page fetching script having less than a full functionality of any of the web browsers, and the automated browsing cluster operates to fetch the web page using the web page fetching script.

* * * * *